United States Patent Office 3,418,679
Patented Dec. 31, 1968

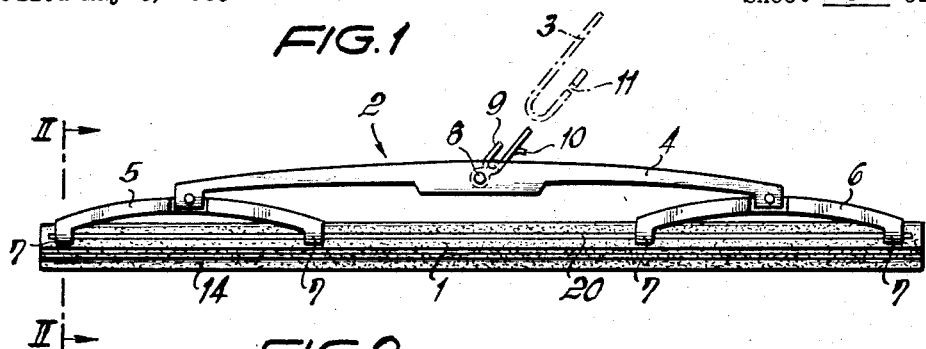
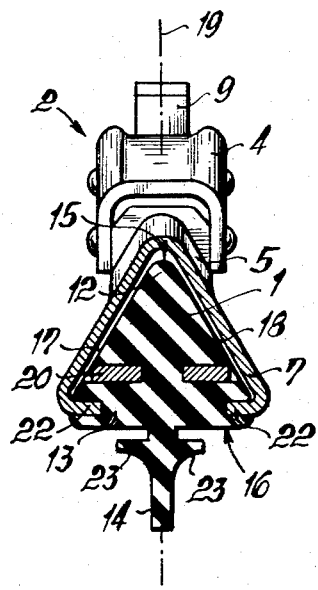
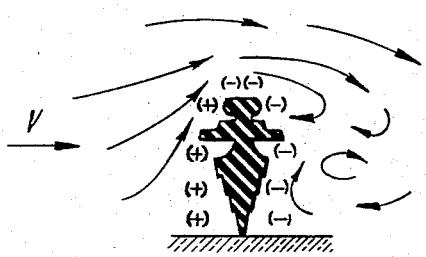
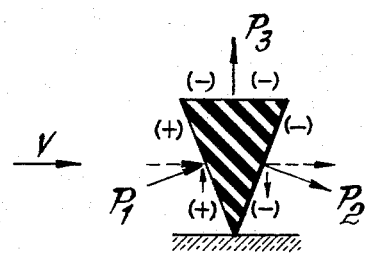
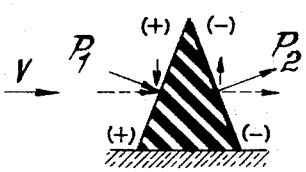
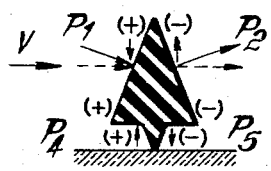
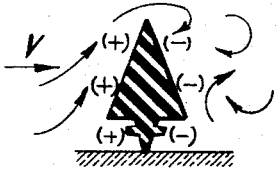

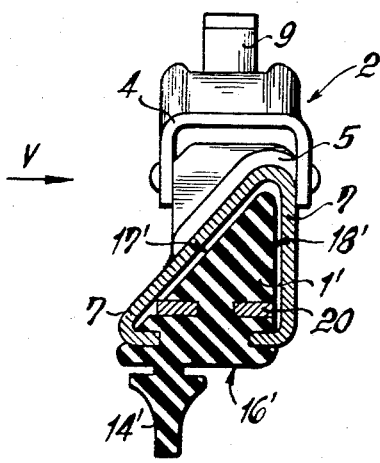
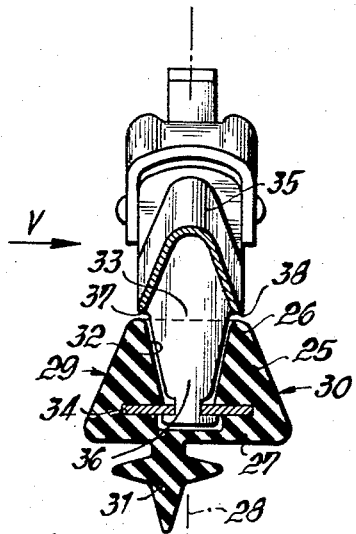
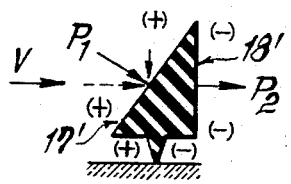
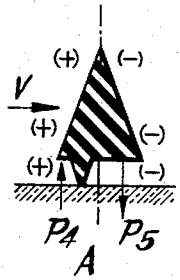
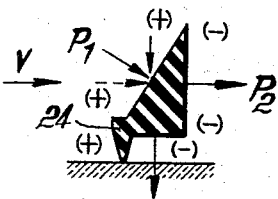
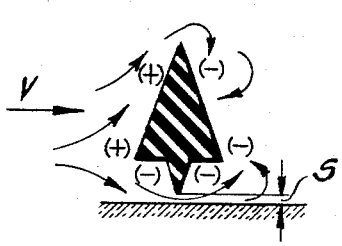
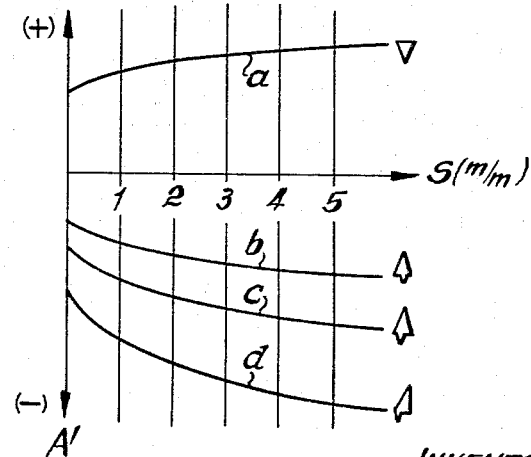

3,418,679
WINDSHIELD WIPER
Robert Barth, Waldstetten, and Gerhard Adalbert,
Stuttgart-Bad, Germany, assignors to Robert Bosch
G.m.b.H., Stuttgart, Germany
Filed May 4, 1966, Ser. No. 547,569
Claims priority, application Germany, May 7, 1965,
B 81,811/65
6 Claims. (Cl. 15—250.36)

ABSTRACT OF THE DISCLOSURE

A windshield wiper comprises a reciprocable wiper element having an elongated carrier of triangular cross-section whose base faces the windshield. An elongated wiper blade extends from the base towards and into engagement with the windshield. Means is provided for reciprocating the wiper element and air currents which develop during such reciprocation sweep along the rearwardly tapering sides of the carrier and thereby exert a component of force thereon tending to displace the carrier in the direction toward the windshield to prevent lift-off of the blade from the windshield.

---

The present invention relates to a windshield wiper for automotive vehicles. More specifically, the invention relates to such a windshield wiper which is not subject to deflection away from the windshield by air currents generated by the motion of the windshield wiper and/or the automotive vehicle.

It is well known in accordance with aerodynamic principles that the smooth flow of air over a surface is disrupted by any protuberances on such a surface. This causes disturbances and eddy currents in the air flow. In automotive vehicles a particular cause of disturbances of the air flow in the region of the windshield of the vehicle are the windshield wipers. As the air flows over these wipers, eddy currents are generated and differences in the static air pressure occur in the region of the wipers. Such pressure differences become effective on the windshield wiper in the form of a force whose action on the type of windshield wiper known from the prior art, namely the type whose cross section decreases in direction towards the windshield, results in a tendency to lift the wiper from the windshield. Complete liftoff occurs particularly at higher speeds of the vehicle, but even at lower speeds the forces acting on the windshield wipers are sufficiently strong to counteract the biasing action provided by biasing means which serve to press the windshield wiper against the windshield. Naturally, proper wiping action is impeded or even made completely impossible in such a case.

It is therefore a general object of the present invention to overcome the above-discussed disadvantages of the prior art in this field.

A more specific object of the present invention is to provide a windshield wiper which is not subject to undesired lift-off by forces generated by air currents flowing over the windshield and the windshield wiper.

In accordance with one feature of the present invention I provide a windshield wiper which comprises a wiper element having an elongated carrier. The carrier is provided with a base and the windshield wiper further comprises an elongated windshield-contacting wiper blade which is integral with the base and extends therefrom. The carrier tapers in direction away from the blade. Finally, I provide means for reciprocating the carrier.

The construction which I have set forth above overcomes the disadvantages to which prior-art constructions are subject. I have found that in the prior-art constructions, where the cross sectional area of the wiper blade diverges in direction away from the windshield, a sub-ambient air pressure develops which increases in proportion to the increase in width of the wiper blade on its side or back facing away from the windshield. It is obvious from this that lift-off forces acting on the wiper blade in the region of the contact thereof with the windshield, and tending to lift the blade away from the windshield, are not counteracted by air pressure, but rather are in fact aided by the sub-ambient pressure against that side of the wiper blade which faces away from the windshield.

My deliberations concerning this phenomenon have indicated that if it is possible to eliminate the sub-ambient air pressure acting on the back side of the wiper blade which faces away from the windshield, this undesirable situation in which the lift-off forces are in fact enhanced, can be overcome. I have further found that a proper configuration of the wiper blade can even be utilized to obtain, from the air currents flowing over the blade, forces which actually tend to press the blade against the windshield.

This I can obtain in particular if that lateral face of the wiper blade which is exposed to the main air flow forms with the windshield a smaller angle than the lateral face which faces away from the main air flow. This, as indicated earlier, results in a construction in which the individual forces acting on the two lateral faces of the blade together constitute a force biasing the blade in connection toward the windshield, or in which this force at least counteracts the lift-off forces generated at other parts of the wiper. In this connection I have found it to be particularly advantageous if the windshield-contacting portion of the wiper blade is off-set from the center of the blade slightly in direction towards that lateral face of the blade which faces the main air current. This latter arrangement obtains a force at the base of the wiper blade which also exerts a biasing action in direction towards the windshield.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a lateral view of a winshield wiper arrangement for automotive vehicles in a first embodiment;

FIG. 2 is an enlarged sectional view through the embodiment shown in FIG. 1, taken on the line II—II thereof;

FIGS. 3 and 4 respectively illustrates the theory of air flow and lift-off forces as it pertains to the prior-art;

FIG. 5 illustrates the theory of the biasing forces as they pertain to the novel invention;

FIG. 6 illustrates the theory shown in FIG. 5 with reference to a particular embodiment of the present invention in diagrammatic form;

FIG. 7 is similar to FIG. 6 but illustrates a further embodiment of the invention;

FIG. 8 is a cross section through an embodiment of the present invention illustrating a further embodiment of the invention;

FIGS. 9–11 show in diagrammatic form additional embodiments of the invention and the biasing forces which act upon them;

FIG. 12 is a cross section through a further embodiment of the invention;

FIG. 13 shows in diagrammatic form the air flow with respect to my novel windshield wiper at such time as a space occurs between the windshield-contacting portion and the windshield; and FIG. 14 is a graph showing, with respect to wiper blade profiles in accordance with the prior art and also with the present invention, the forces which act on the wiper blade when a space occurs between the windshield-contacting portion of the blade and the windshield.

Discussing now the drawing in detail, and firstly FIGS. 1 and 2 thereof, it will be seen that the blade shown there comprises a carrier 1 which is connected by way of a support 2 with a wiper arm 3 indicated in dot-dash lines.

The support 2 consists, as is evident in FIG. 2, of a main member 4 of generally U-shaped profile and two intermediate members 5, 6 of substantially triangular or gable roof-shaped cross section which are pivotally secured to the respective ends of the main support 2. The respective ends of the intermediate supports 5, 6 are constituted as engagement clamps 7 which surround the carrier 1 and secure the same to the intermediate supports 5, 6 with such freedom of movement relative thereto as is requisite for proper operation of the wiper. The main support 4 is provided centrally thereof with a transversely extending bolt 8 on which a two-armed spring member 9 is journalled. The free end of the wiper arm 3 is bent backwards in a hook-shape and the wiper is secured to the arm by sliding the hook-shaped end of the arm over the bolt 8 and the spring member 9 until a projection 10 provided on the spring member 9 snaps into an opening 11 provided on the hook-shaped end of the wiper arm 3 and thus secures the wiper against accidental dislodging.

As is evident particularly from FIG. 2 the carrier 1 in this embodiment is of triangular cross section and is so arranged with respect to the windshield that a corner 12 of the triangle points away from the windshield, whereas the base 13 of the triangle faces the windshield and carries the windshield-contacting wiper blade 14. In the embodiment shown, the blade 14 is integral with the base 13 of the carrier 1. The carrier 1, by virtue of its triangular cross section, has a face 16 which is juxtaposed with the windshield, two lateral faces 17, 18 which form substantially identical angles with the centerline 19 of the carrier, and a back 15 facing away from the windshield. Each of the lateral faces 17, 18 is provided with a longitudinally extending groove or recess in which there is respectively received a metallic spring member 20 and these recesses are so arranged that the spring members 20 are spaced from the face 16 by a distance which is less than their spacing from the back 15 of the carrier 1. The characteristics of the spring members 20 are such that the carrier 1 is elastically bendable in direction towards the windshield but is relatively stiff transversely of this direction. The clamps 7 of the intermediate supports 5, 6 extend into the carrier in the bottom region 13 thereof with their inwardly bent end portions 22, and downwardly of the spring members 20.

As is evident from FIG. 2, the blade 14 itself is of lesser height than the carrier, as measured intermediate the face 16 and the back 15 thereof, and is provided at its lateral sides with respective longitudinally extending ridges 23.

These ridges 23 respectively engage the face 16 of the carrier 1 when the wiper moves over the windshield, and thus limit the angular displacement of the blade 14 with respect to the plane of symmetry 19 of the carrier 1.

FIGS. 3–7 indicate how prior-art wipers and wipers in accordance with the present invention compare in their aerodynamic characteristics. In FIGS. 3–7 and in all other figures following in the drawings, the arrow V indicates the flow of air impinging on the wiper. Air flow in longitudinal direction of the wiper blade has been disregaded and only lateral flow of air, as indicated by the arrow V, has been taken into consideration for the purposes of the discussion following hereafter, inasmuch as such lateral air flow generates forces which are stronger than flow in longitudinal direction of the wiper and because it is these forces generated by the lateral air flow which have the greater tendency to lift the wiper away from the windshield. Static over and underpressure at the various portions of the wiper has been indicated with the symbols $(+)$ and $(-)$ and the terms over- and underpressure are employed with reference to normal air pressure in the air flow indicated by the arrow V.

Discussing now these figures in detail, it will be seen that FIG. 3 shows the air flow and the static pressure conditions with respect to a wiper having the customary so-called "pine tree" profile. It is clearly evident that in the direction of air flow-impingement a zone of static overpressure is generated on that lateral side of the blade which faces the air flow, whereas a zone of static underpressure is present on the lateral side facing away from the air flow as well as on the back of the blade which is located remote from the windshield. The arrows indicating air flow clearly show how the forces generated in this construction tend to lift the blade away from the windshield.

This is shown in still more detail in FIG. 4 where for purposes of simplicity the profile, which has been identified in FIG. 3 as a "pine tree" profile has been shown as a triangle standing on edge with its base remote from the windshield. It is evident from FIG. 4 how the lift-off forces act against the lateral faces of the blade. The zone of static overpressure located on the lateral side onto which the air flow impinges results in an upwardly directed pressure $P_1$, while the zone of underpressure on the other lateral side of the blade results in a downwardly directed pressure $P_2$ of approximately the same magnitude. A third force, the lift-off force $P_3$, acts on the back of the blade. For the purposes of the present consideration only the vertical components of the forces $P_1$ and $P_2$ are of importance and a consideration of these vertical components readily establishes that they negate one another. Thus, the force acting to lift the wiper away from the windshield is the force $P_3$ acting on the back of the wiper.

If one now considers the embodiment shown in FIG. 5, where the triangular profile is reversed in accordance with the present invention so that its base faces the windshield, it will be evident that the vertical components of the forces $P_1$ and $P_2$ again negate one another. Contrary to the prior-art embodiment shown in FIG. 4, however, it will be evident that the lift-off force $P_3$ acting on the back of the wiper is no longer in existence. Developing the stylized profile of FIG. 5 further by providing it with a windshield-contacting portion such as the lip 14 in FIG. 4, this further development being shown in FIG. 6, it will be seen that the vertical components of forces $P_4$ and $P_5$ which act on either lateral side of the blade also substantially negate one another if the lip is arranged approximately centrally of the base of the triangular profile. One thus obtains the specific profile of FIG. 2 which is shown schematically in FIG. 7, and it will be seen that to all intents and purposes there are no lift-off forces operative against a wiper constructed in this manner, so that a wiper of this type is particularly suitable for fast-moving vehicles.

A further embodiment of the wiper is shown in FIG. 8 and it will be seen that the major difference here is the cross sectional configuration of the carrier 1'. Inasmuch as other aspects of the embodiment shown in FIG. 2, the same reference numerals have been utilized, always provided with a "prime" suffix. To indicate specifically the differences between the embodiment of FIG. 8 and that of FIG. 2 it is pointed out that the triangular profile of the carrier 1' in FIG. 8 is nonsymmetrical inasmuch as the lateral face 18' of the carrier 1' which faces away from the direction of air flow extends substantially normal to the face 16' and thus to the windshield, and that the windshield-contacting wiper lip 14' is laterally offset from the plane of symmetry of the face 16' in direction towards that lateral side of the carrier 1' onto which the air flow impinges as indicated by the arrow V. FIG. 9, which is a schematic representation of the embodiment of FIG. 8 except for the fact that the windshield-contacting blade is located centrally of the face 16', shows that the force $P_1$ which acts on the face 17' has a horizontal and a vertical component which latter acts in direction of the windshield. The force $P_2$, on the other hand, which acts on the substantially vertical face 18' has only a horizontal component. The result therefore is a force tending to urge the wiper against the windshield and increasing the wiping pressure, or at least counteracting the lift-off forces generated at other portions of the wiper assembly.

The specific arrangement of the windshield-contacting wiper blade 14' is indicated schematically in FIG. 10 where it will be seen that lateral offsetting of the lip 14' tends to destroy the equilibrium of the forces acting against the face 16' of the carrier 1'. It is evident from FIG. 10 that with this arrangement the force $P_5$ acting in direction of the windshield is stronger than the lift-off force $P_4$ acting to lift the wiper off the windshield, and this again results in an increase of the pressure of the wiper assembly against the windshield.

A modification of the embodiment of FIG. 10 is schematically shown in FIG. 11 and it will be seen that the triangular carrier here is provided on that edge of its face 16' which faces the direction of air flow (indicated by the arrow V) with a projection 24 on which there is arranged a wiper lip corresponding to the lip 14' in FIG. 8. The face corresponding to the face 18' in FIG. 8 again extends substantially vertical to the face 16' and thereby to the windshield, and it will be readily evident that with this arrangement lift-off forces acting on the wiper are substantially eliminated so that this embodiment is particularly advantageous.

Coming now to the embodiment shown in FIG. 12 it will be seen that the carrier 25 therein is provided with a trapezoidal profile which again tapers away in direction from the windshield or, putting it a different way, diverges in direction toward the windshield. The back face 26 of the carrier 25 is accordingly narrower than the bottom face 27 which is juxtaposed with the windshield; furthermore, the carrier is again provided with lateral faces 29, 30 which are inclined toward the longitudinal plane of symmetry 28 of the carrier 25. A windshield-contacting lip 31 is provided on the face 27 and is offset from the longitudinal plane of symmetry 28 of the carrier 25 in direction towards the air flow. The back face 26 of the carrier 25 is provided with a recess extending in direction towards the face 27 and tapering in this direction. This recess 32 extends longitudinally of the carrier 25 to the region of the respective end faces of the carrier. Small cross members are provided between the ends of the recess 32 and the end faces of the carrier 25. The latter is given the requisite rigidity by a spring member 34 which is insertable into a longitudinal groove provided inwardly adjacent the face 27 of carrier 25 by introducing it into the recess 32 and temporarily deforming the carrier 25. The various supports for the carrier and blade shown in FIG. 12 are substantially similar to the ones shown in FIG. 1 and differ therefrom only in the construction of the intermediate supports which are here indicated with reference numeral 35. These supports 35 are provided at their respective ends with clamps 36 which engage into the recess 32 and are connected at their free ends to the spring member 34 with some freedom of movement. The spacing between the longitudinal edges 37, 38 of the intermediate supports 35 which face the carrier 25 corresponds approximately to the width of the back face 26 of the carrier. The intermediate supports 35 thus complete, in the area in which the carrier and the support are connected the exterior trapezoidal profile of the carrier into a triangular profile having an edge pointing away from the windshield. The windshield-contacting blade 31 is again offset as for example shown in FIG. 8, for the reasons already discussed.

Of particular importance with respect to the embodiments shown and described herein are the highly advantageous aerodynamic characteristics of these embodiments when a space occurs between the windshield-contacting lip and the windshield. Air flowing through this space undergoes an acceleration which results in a static underpressure on both sides of the windshield-contacting lip and the forces acting on the base of the carrier are illustrated in FIG. 13. The space is indicated with symbol S and it will be seen that the force which results tends to urge the wiper back into contact with the windshield.

This is particularly evident from the graph shown in FIG. 14 where the influence of the width of such spaces which latter are indicated with symbol $s$, on the lift-off forces A and A', respectively, is shown for different wiper profiles. The hitherto customary profile is shown at the top of the graph and it will be seen that the lift-off force A increases in accordance with the line $a$ as the width of the spacing $s$ between the windshield-contacting lip and the windshield increases. Thus, when a spacing $s$ has occurred with a wiper having such a profile, the tendency is for the spacing to increase. This is not so in wiper profiles in accordance with the present invention, and it will be seen that with these the force urging the wiper back into engagement with the windshield increases even as the spacing $s$ between the lip and the windshield increases, as is evident from lines $b$, $c$ and $d$, so that wipers having such profiles have a tendency to immediately reengage the windshield.

It should be pointed out here that an advantage of the embodiments shown herein is the arrangement of the flexible stiffening or reinforcing members in such proximity to the base of the carrier that bending and conforming of the carrier and the blade to strongly curved sections of the windshield is possible without undesired deformation of the carrier and the lip.

It will be understood that each of the elements described above, or two or more together, may also find a useful application in other types of windshield wiper differing from the types described above.

While the invention has been illustrated and described as embodied in windshield wipers, it is not intended to be limited to the details shown, since various modifications and structural changes may be made without departing in any way from the spirit of the present invention.

Without further analysis, the forgoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A windshield wiper comprising a reciprocable wiper element having an elongated carrier of triangular cross-section and of a predetermined thickness and provided with a base surface of predetermined width paralleling the windshield and with a pair of lateral surfaces, both of which define an angle with said base surface and at least one of which is inclined in direction toward the other lateral surface; an elongated windshield-contacting wiper blade extending along said base surface integral with said carrier and projecting therefrom and having a width and thickness substantially smaller than said predetermined width and thickness; and means for reciprocating said wiper element whereby air currents develop during such reciprocation which sweep along said lateral surfaces of said carrier and tend to displace the latter in direction toward the windshield.

2. A windshield wiper as defined in claim 1, wherein one of said lateral sides is substantially normal to the face of said base.

3. A windshield wiper comprising a reciprocable wiper element having an elongated carrier provided with a base having a face opposing the windshield; an elongated windshield-contacting wiper blade reciprocable with and extending from said base, said carrier tapering in direction away from said blade and having two lateral sides each making a different angle with said face; and means for effecting reciprocation of said wiper element with concomitant development of air currents which sweep along the tapering portion of said carrier and thereby tend to displace the latter in direction toward the windshield.

4. A windshield wiper comprising a reciprocable wiper element having an elongated carrier provided with a base having a face opposing the windshield; an elongated windshield-contacting wiper blade reciprocable with and projecting from said base extending lengthwise thereof, said blade being offset from the center of said base and said carrier tapering in direction away from said blade; and means for effecting reciprocation of said wiper element with concomitant development of air currents which sweep along the tapering portion of said carrier exerting upon one lateral side of the same and of said blade a pressure which is greater than the pressure at the other lateral side thereof and tending to displace said carrier and blade in direction toward the windshield.

5. A windshield wiper comprising a reciprocable wiper element having an elongated carrier of triangular cross-section provided with a base surface substantially paralleling the windshield and a pair of lateral sides at least one of which is inclined in direction toward the other lateral side, an elongated supporting rib extending laterally from one of said sides at said base surface and carrying an elongated windshield-contacting wiper blade; and means for reciprocating said wiper element whereby air currents developed during such reciprocation sweep along said lateral sides of said carrier and tend to displace the latter in direction toward the windshield.

6. A windshield wiper as defined in claim 5, wherein said rib is integral with said carrier and with said blade.

References Cited

UNITED STATES PATENTS

| | | | |
|---|---|---|---|
| 3,082,464 | 3/1963 | Smithers | 15—250.42 |
| 3,320,628 | 5/1967 | Bacher et al. | 15—250.42 |

WALTER A. SCHEEL, *Primary Examiner.*

R. I. SMITH, *Assistant Examiner.*